US010129633B1

(12) United States Patent
Patil et al.

(10) Patent No.: US 10,129,633 B1
(45) Date of Patent: Nov. 13, 2018

(54) AUTOMATED AWARENESS FOR ANR SYSTEMS

(71) Applicant: Bose Corporation, Framingham, MA (US)

(72) Inventors: NB Patil, Ashland, MA (US); Nathan Blagrove, Wayland, MA (US); Stephen McDonald, Northborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/783,529

(22) Filed: Oct. 13, 2017

(51) Int. Cl.
*H04R 1/10* (2006.01)
*G08B 3/10* (2006.01)

(52) U.S. Cl.
CPC ............. *H04R 1/1083* (2013.01); *G08B 3/10* (2013.01); *H04R 2430/01* (2013.01)

(58) Field of Classification Search
CPC ... G06F 3/017; G06F 1/3231; G06K 9/00335; G06K 2009/00738; G06K 9/00288; G06K 9/00671; G06K 9/00711; G06K 9/00832; H04N 21/4882; H04R 1/1083; G10K 11/178; G10K 2210/30231
See application file for complete search history.

(56) References Cited

U.S. PATENT DOCUMENTS

| | | | |
|---|---|---|---|
| 8,155,334 B2 | 4/2012 | Joho et al. | |
| 8,798,283 B2 | 8/2014 | Gauger, Jr. et al. | |
| 9,123,320 B2 | 9/2015 | Carreras et al. | |
| 9,305,568 B2 | 4/2016 | Kraft et al. | |
| 9,524,731 B2 | 12/2016 | Kraft et al. | |
| 9,557,960 B2 | 1/2017 | Kraft et al. | |
| 9,560,437 B2 | 1/2017 | Jaffe et al. | |
| 9,584,899 B1 | 2/2017 | Klimanis et al. | |
| 9,648,436 B2 | 5/2017 | Kraft et al. | |
| 2007/0185601 A1* | 8/2007 | Lee | G06F 3/16 700/94 |
| 2010/0296668 A1* | 11/2010 | Lee | G10K 11/1784 381/94.7 |
| 2013/0236040 A1* | 9/2013 | Crawford | H04S 7/304 381/310 |
| 2014/0002474 A1* | 1/2014 | Ashbrook | A63F 13/10 345/589 |
| 2014/0147021 A1* | 5/2014 | Wang | G06F 3/011 382/118 |

(Continued)

*Primary Examiner* — Mohammad Islam
(74) *Attorney, Agent, or Firm* — Bond, Schoeneck & King, PLLC

(57) ABSTRACT

A method for automatically alerting, via an active noise reducing device having a sensor, a user to a predetermined or learned trigger in an external environment includes the steps of: (i) receiving, via the sensor while the active noise reducing device is in a first noise reduction mode, sensor data from the external environment; (ii) identifying, from the sensor data, the predetermined or learned trigger in the external environment; and (iii) automatically providing an alert to the user, in response to detection of the trigger, indicating the predetermined or learned trigger in the external environment, wherein the alert comprises entering a second operating mode of the active noise reducing device, the second operating mode characterized by providing hear-through of ambient sound in the external environment to the user.

21 Claims, 3 Drawing Sheets

(56) References Cited

U.S. PATENT DOCUMENTS

| | | | | |
|---|---|---|---|---|
| 2014/0292512 | A1* | 10/2014 | Mizui ................ | H04N 1/00323 340/539.13 |
| 2014/0341387 | A1 | 11/2014 | Gauger, Jr. et al. | |
| 2015/0382106 | A1 | 12/2015 | Kraft et al. | |
| 2016/0026871 | A1* | 1/2016 | Wexler ................. | H04N 5/2257 382/103 |
| 2016/0077794 | A1* | 3/2016 | Kim ........................ | G06F 3/167 704/275 |
| 2016/0142820 | A1 | 5/2016 | Kraft et al. | |
| 2016/0210958 | A1 | 7/2016 | Gauger, Jr. et al. | |
| 2016/0351183 | A1 | 12/2016 | Gauger, Jr. et al. | |
| 2017/0048616 | A1 | 2/2017 | Kraft et al. | |
| 2017/0099538 | A1 | 4/2017 | Kraft et al. | |
| 2017/0105064 | A1 | 4/2017 | Jaffe et al. | |
| 2017/0147284 | A1 | 5/2017 | Klimanis et al. | |
| 2017/0150246 | A1 | 5/2017 | Rule et al. | |
| 2017/0256181 | A1* | 9/2017 | Chen .................... | G09B 21/003 |
| 2017/0345267 | A1* | 11/2017 | Flint ................ | G08B 13/19695 |
| 2018/0032997 | A1* | 2/2018 | Gordon .............. | G06Q 20/3224 |

* cited by examiner

AUTOMATED AWARENESS FOR ANR SYSTEMS

BACKGROUND

The disclosure relates to methods, devices, and systems for automatically alerting a user to a trigger or cue in the external environment using an active noise reducing device comprising a sensor.

SUMMARY

All examples and features mentioned below can be combined in any technically possible way.

In an aspect, a method of automatically alerting a user to a predetermined trigger in an external environment using an active noise reducing device comprising a sensor includes: (i) receiving, via the sensor while the active noise reducing device is in a first noise reduction mode, sensor data from the external environment; (ii) identifying, from the sensor data, the predetermined trigger in the external environment; and (iii) automatically providing an alert to the user, in response to detection of the trigger, indicating the predetermined trigger in the external environment, wherein the alert comprises entering a second operating mode of the active noise reducing device, the second operating mode characterized by providing hear-through of ambient sound in the external environment to the user.

Embodiments may include one of the following features, or any combination thereof. The sensor may be disposed on an external portion of the active noise reducing device. The sensor may be a camera. The sensor may be one or more microphones. The sensor may be a LIDAR sensor, a radar sensor, a thermal sensor, and/or an ultrasonic sensor.

Embodiments may include one of the following features, or any combination thereof. The predetermined trigger may be a specific person identified by facial recognition analysis of the sensor data. The predetermined trigger may be a specific sound identified by the sensor data, such as a sound identified from the sensor data as coming from a particular location relative to the user.

Embodiments may include one of the following features, or any combination thereof. The alert may comprise a haptic or audio signal to the user. The alert may comprise pausing or stopping a playback of audio via the device, lowering a volume of the device, and/or amplifying a sound from the external environment. The alert may comprise entering a second operating mode of the active noise reducing device, the second operating mode characterized by providing hear-through of ambient sounds in the external environment to the user. As part of hear-through, the ambient sound may be amplified.

Embodiments may include one of the following features, or any combination thereof. The method may further include the step of indicating, via the device, that the alert has been provided to the user.

Embodiments may include one of the following features, or any combination thereof. The identifying step of the method may be performed by an external computing device, to which sensor data may be wirelessly transmitted.

In another aspect, an active noise reducing device includes an earpiece, a sensor configured to obtain sensor data from an external environment, and a processor configured to: (i) receive, via the sensor while the active noise reducing device is in a first noise reduction mode, sensor data from the external environment; (ii) identify, from the sensor data, the predetermined trigger in the external environment; and (iii) automatically provide an alert to the user, in response to detection of the trigger, indicating the predetermined trigger in the external environment, wherein the alert comprises entering a second operating mode of the active noise reducing device, the second operating mode characterized by providing hear-through of ambient sound in the external environment to the user.

Embodiments may include one of the following features, or any combination thereof. The sensor may be disposed on an external portion of the active noise reducing device. The sensor may be, for example, a LIDAR sensor, a radar sensor, a thermal sensor, an ultrasonic sensor, a camera, and/or a microphone.

Embodiments may include one of the following features, or any combination thereof. The active noise reducing device may include an indicator configured to indicate that the alert has been provided to the user.

In another aspect, an active noise reducing system includes: (i) active noise reducing device comprising an earpiece, and a sensor configured to obtain sensor data from an external environment while the active noise reducing device is in a first noise reduction mode; and (ii) a processing device configured to: identify, from the sensor data, the predetermined trigger in the external environment, and direct the active noise reducing device to provide an alert to the user, in response to detection of the trigger, indicating the predetermined trigger in the external environment, wherein the alert comprises entering a second operating mode of the active noise reducing device, the second operating mode characterized by providing hear-through of ambient sound in the external environment to the user.

DETAILED DESCRIPTION

Headphones and other electronic active noise reducing (ANR) devices worn by a user to isolate the user's ears from unwanted ambient sounds are ubiquitous. Many of these ANR headphones or other electronic devices also provide functionality to allow a user to listen to audio such as playback of recorded audio or audio received from another device, without unwanted ambient sounds from the external environment.

However, ANR devices can have several drawbacks. For example, one of these drawbacks is the reduction of desirable ambient sounds from the external environment. These sounds may be alerts, other individuals, announcements, or a variety of other desirable sounds that the user would like to receive while using the ANR device. Missing these desirable ambient sounds from the external environment can have negative consequences for the user. Accordingly there is a need for ANR devices that can identify desirable ambient sounds from the external environment and automatically alert the user to those identified ambient sounds.

Figure 1:
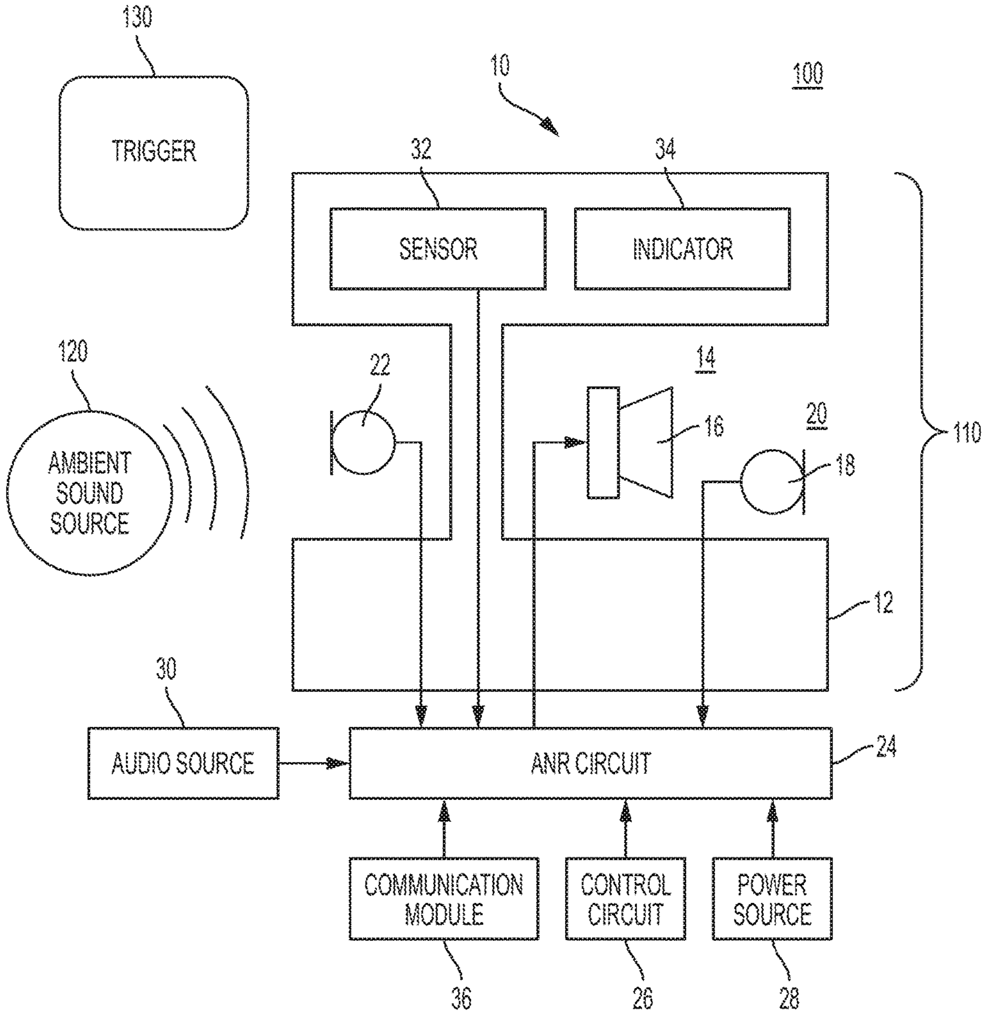
FIG. 1 is a schematic representation of an example active noise reducing device.

FIG. 1 is a schematic representation of an example ANR system 100 including an ANR device 10, such as a headphone system or other electronic ANR device. The ANR device 10 may comprise any of the embodiments described or otherwise envisioned herein. Although only a single earpiece 110 is depicted and described in relation to FIG. 1, the ANR device 10 may provide noise reduction and/or audio functionality for one or both of a user's ears.

Each earpiece 110 includes a casing 12 that defines a cavity 14 in which an acoustic transducer 16 and an internal microphone 18 is disposed. In some examples, the internal microphone 18 is a feedback microphone. An example with two earpieces 110 may be connected by a connection such as an on-ear or around-ear implementation, or by a wire or cord, or may be completely wireless with no band or cord between the earpieces. An earpiece 110 may also include an ear coupling such as an ear tip or an ear cushion (not shown) attached to the casing 12 for coupling the earpiece to a user's ear or head. When the earpiece 110 is worn by the user, a passage 20 acoustically couples the cavity 14 to the ear canal of the user to form an acoustic seal. The acoustic seal enables the casing 12 and the user's ear to acoustically isolate the cavity 14 and the passage 20 from the external environment to provide noise reduction.

The ANR device 10 also includes an external microphone 22, which may function as a feedforward microphone for feedforward-based ANR capabilities of the device. The external microphone 22 is disposed on the exterior of the casing 12 or otherwise configured to be acoustically accessible to the external environment. The external microphone 22 receives acoustic signals from an ambient sound source 120 in the external environment. These received acoustic signals can be utilized to generate feedforward anti-noise signals or sounds that are acoustically output into the cavity 14 for active noise reduction.

Each device 10 or earpiece 110 comprises an ANR circuit 24 in communication with the external microphone 22 and optionally the internal microphone 18. The ANR circuit 24 receives, via the external microphone 22, signals representative of the acoustic signals from an ambient sound source 120 in the external environment, and performs an ANR process for the corresponding earpiece. For example, the process includes providing a signal to acoustic transducer 16 disposed in the cavity 14 to generate an anti-noise acoustic signal that reduces or substantially prevents sound from the ambient sound source 120 in the external environment from being heard by the user. A portion of or all of the ANR circuit 24 may be disposed within the casing 12 of the earpiece. Alternatively and/or additionally, a portion of or all of the ANR circuit 24 may be disposed within another portion of the ANR device 10 or system 100.

In implementations providing feedback-based ANR, the internal feedback microphone 18 is located in cavity 14 near or in passage 20 to be positioned close to the entrance of the user's ear when the device 10 is worn by the user. The ANR circuit 24 receives, via the internal feedback microphone 18, signals representative of the acoustic signals from the cavity, and performs an ANR process for the corresponding earpiece. For example, the process includes providing a signal to acoustic transducer 16 disposed in the cavity 14 to generate an anti-noise acoustic signal that reduces or substantially prevents unwanted sound from the cavity 14 from being heard by the user.

A control circuit 26 is in communication with the ANR circuit 24. The control circuit may also be in communication with one or more of the internal feedback microphone 18, the external feedforward microphone 22, and/or other components of the earpiece 110 or device 10. In certain examples, the control circuit 26 includes a microcontroller or processor having a digital signal processor (DSP) and signals from the microphones 18 and 22 are converted to digital format by analog to digital converters. In response to the received signals, the control circuit 26 can generate one or more signals which can be used for a variety of purposes, including controlling various features of the personal acoustic device 10. For example, the control circuit 26 may generate a signal that is used to control a power source 28 for the device 10. The control circuit 26 and power source 28 may be in one or multiple earpieces 110 or may be in a separate housing in communication with earpieces 110.

In an implementation of the device or system providing audio to the user via acoustic transducer 16, the ANR device 10 is coupled to an audio source 30. The ANR circuit 24 receives pass-through audio signals from the audio source 30 to be acoustically output by the acoustic transducer 16 to the user's ear. The audio may be transmitted audio, playback of stored audio, or any other form of audio to be played for the user. All or a portion of the audio source 30 may be a component of the ANR device 10. Alternatively and/or additionally, all or a portion of the audio source 30 may be a component of a separate or remote device, and may be electrically or optically coupled to the ANR device. For example, the audio source 30 may be a digital audio player, a CD player, a smartphone, a television, a computer, or any other audio source.

The ANR device 10 comprises a sensor 32 configured to obtain sensor data representative of or indicative of a trigger 130 in the external environment. The ANR device may comprise one sensor 32 or multiple sensors 32. All or a portion of the sensor 32 may be located in one earpiece 110 or elsewhere within the ANR device 10. In configurations with two earpieces, each earpiece may comprise a sensor 32, or only a single sensor 32 may be provided for both earpieces. The sensor may be any sensor capable or and/or configured to detect an external trigger 130. For example, the sensor may be a LIDAR sensor, a radar sensor, a thermal sensor, an ultrasonic sensor, a camera, and/or a microphone, among many other types of sensors. The sensor 32 may be coupled to the ANR circuit 24 and/or the control circuit 26. In one implementation, the sensor 32 is configured or programmed to provide obtained sensor data to the ANR circuit 24 and/or the control circuit 26, where it is analyzed for data representative of or indicative of the trigger 130 in the external environment. In another implementation, the sensor analyzes the obtained sensor data to identify and/or characterize the trigger 130 in the external environment.

Trigger 130 may be any trigger, event, condition, person, sound, object, or other predetermined element to which the user wants to be notified. For example, the trigger may be the presence and/or proximity of an individual or other item, the presence and/or proximity of a particular individual as detected by facial recognition or other cue, a noise or sound within the external environment, a specific sound such as an announcement, and/or a specific person's voice. When the trigger 130 is identified by the sensor 32, ANR circuit 24, and/or device 10, the ANR device alerts the user to the presence and/or identity of the trigger 130 via an alert mechanism. The alert mechanism may be any response or action by the device 10 or a component of the device to alert the user to the presence and/or identity of the trigger 130. For example, the alert may be a haptic or audio signal to the user, pausing or stopping a playback of audio via the device, changing the volume of the audio, entering a second operating mode, playing a tone, selecting audio for playback to the user, and/or electronically orienting a microphone array, among many other possible alerts.

In an implementation with multiple sensors 32, the data representative or indicative of the presence and/or identity of trigger 130 in the external environment may activate or otherwise affect another sensor. For example, audio data from sensor 32 may indicate the presence of a person, and this may activate a camera sensor 32 to obtain visual data to confirm, identify, or otherwise characterize the source of the audio data.

According to an embodiment, ANR device 10 may comprise an indicator 34 configured or designed to indicate that the user of the ANR device has been alerted to the presence and/or identity of trigger 130 in the external environment. The indicator may be a light, visual display, and/or sound, among many other possible indicators. For example, the indicator may be disposed on or in one or more external surfaces of the earpiece 110 or ANR device 10 to provide an indication to the external environment that trigger 130 has been identified, and/or that the user has been notified of the trigger. For example, if the trigger is the presence of an individual other than the user, the detection of an individual in the external environment will trigger an alert to the user, and the indicator 34 will provide an indication, such as a light, sound, or visual display, that the individual has been detected. The indicator 34 can, for example, provide an indication to the external environment that the ANR device has entered an alternative operating mode in response to detection of a trigger.

According to an embodiment, ANR device 10 may comprise a communication module 36 configured to wired and/or wirelessly communicate with another component of the device, and/or with another device. For example, ANR device 10 may communicate with an external source to receive audio data, such as a digital audio player, a CD player, a smartphone, a television, a computer, or any other audio source.

Figure 2:
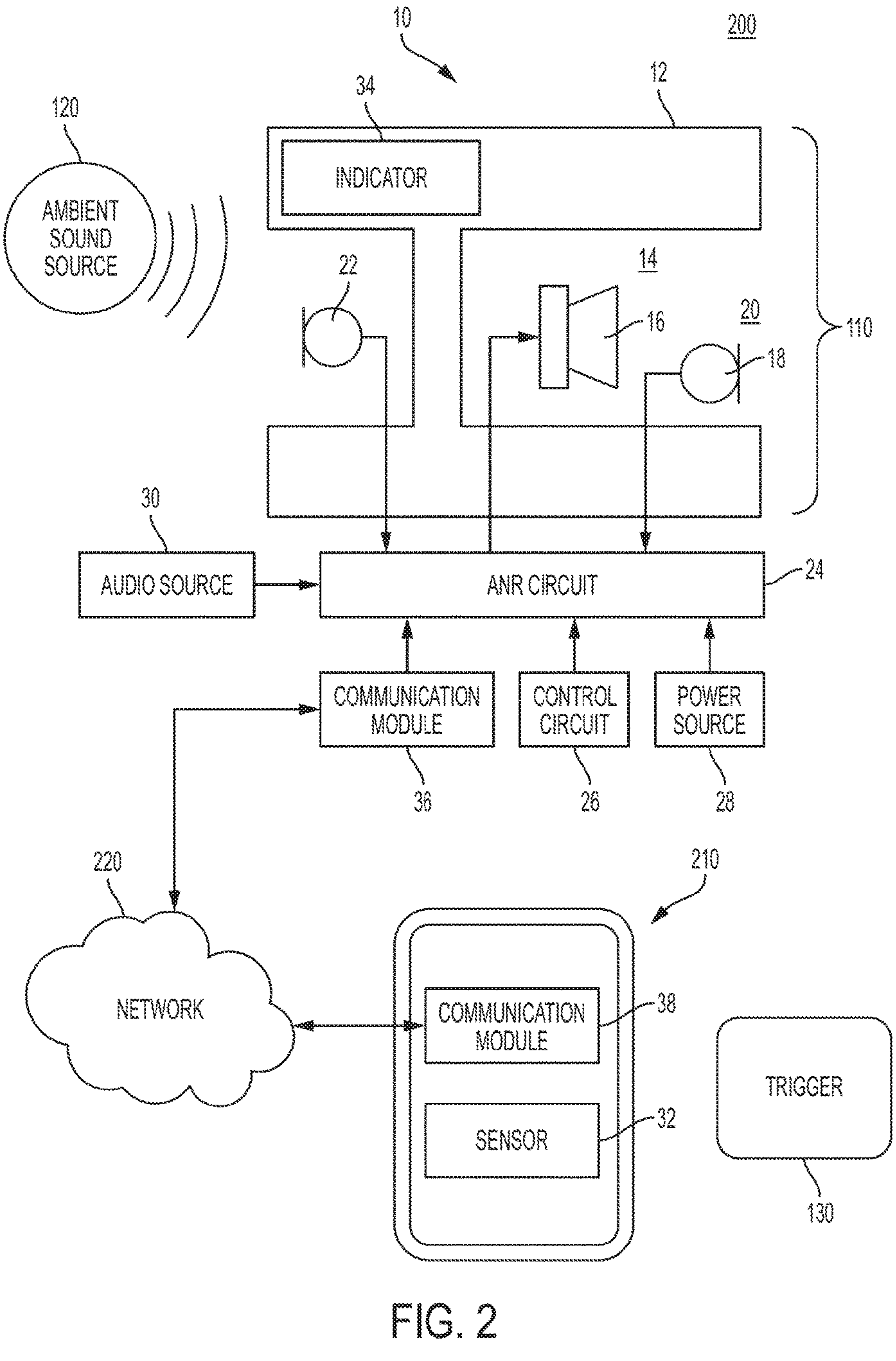
FIG. 2 is a schematic representation of an example active noise reducing system.

FIG. 2 is a schematic representation of an example ANR system 200 including an ANR device 10, such as a headphone system or other electronic ANR device, and an external computing device 210, such as a computer, smartphone, wearable computing device, or other external computing device. According to an embodiment, sensor data is wirelessly transmitted to the external computing device.

The ANR device 10 may comprise any of the embodiments described or otherwise envisioned herein. Although only a single earpiece 110 is depicted and described in relation to FIG. 1, the ANR device 10 may provide noise reduction and/or audio functionality for one or both of a user's ears. The ANR device and/or each earpiece 110 may include one or more of the components described in conjunction with FIG. 1. Earpiece 110 includes a casing 12 that defines a cavity 14 in which an acoustic transducer 16 and an internal microphone 18 is disposed. The ANR device 10 also includes an external microphone 22, which may function as a feedforward microphone for feedforward-based ANR capabilities of the device.

Device 10 or earpiece 110 comprises an ANR circuit 24 in communication with the external microphone 22 and optionally an internal microphone 18. The ANR circuit is configured to receive signals from a microphone and perform an ANR process, including providing a signal to acoustic transducer 16 disposed in the cavity 14 to generate an anti-noise acoustic signal that reduces or substantially prevents unwanted sound from the ambient sound source 120 in the external environment and/or from cavity 14 from being heard by the user. The ANR device 10 includes a control circuit 26 communication with the ANR circuit 24. The control circuit may also be in communication with one or more of the internal feedback microphone 18, the external feedforward microphone 22, and/or other components of the earpiece 110 or device 10.

The ANR device 10 also includes a communication module 36 configured to wired and/or wirelessly communicate with another component of the device, and/or with another device such as the external computing device 210. Additionally and/or alternatively, the communication module 36 may communicate with an external source to receive audio data, such as a digital audio player, a CD player, a smartphone, a television, a computer, or any other audio source.

The ANR device 10 may also include or be coupled to an audio source 30 configured to provide audio signals that are ultimately provided to the acoustic transducer 16 and the user's ear. For example, the audio source 30 may be a digital audio player, a CD player, a smartphone, a television, a computer, or any other audio source. In the implementation shown in FIG. 2, the audio source 30 may be the external computing device 210.

The ANR device 10 may also comprise an indicator 34 configured or designed to indicate that the user of the ANR device has been alerted to the presence and/or identity of a trigger 130 in the external environment. The indicator may be a light, visual display, and/or sound, among many other possible indicators. For example, the indicator may be disposed on or in one or more external surfaces of the earpiece 110 or ANR device 10 to provide an indication to the external environment that trigger 130 has been identified, and/or that the user has been notified of the trigger.

External computing device 210 may be any device configured to or capable of communicating with the ANR device 10, such as a computer, smartphone, wearable computing device, or other external computing device. According to an embodiment, external computing device 210 is configured to perform and/or support one or more operations for the ANR device 10.

In one implementation, external computing device 210 includes a sensor 32 configured to obtain sensor data representative of or indicative of a trigger 130 in the external environment. The sensor 32 is any sensor capable or and/or configured to detect an external trigger 130, including but not limited to a LIDAR sensor, a radar sensor, a thermal sensor, an ultrasonic sensor, a camera, and/or a microphone, among many other types of sensors. The external computing device 210 may comprise one sensor 32 or multiple sensors 32. In one implementation, the sensor 32 is configured to identify and/or characterize the trigger 130 in the external environment. In another implementation, the sensor 32 is configured to provide obtained sensor data to a processor of the external computing device 210 which identifies and/or characterizes the trigger 130 in the external environment. Additionally and/or alternatively, the external computing device 210 communicates the obtained sensor data to the ANR circuit 24 and/or the control circuit 26 of the ANR device 10, where it is analyzed for data representative of or indicative of the trigger 130 in the external environment.

External computing device 210 may include a communication module 38 wired and/or wireless communication with the ANR device 10 and/or any other external component or device. Additionally, example ANR system 200 may include a network 220 configured for or otherwise enabling or providing communication between the external computing device 210, the ANR device 10, and/or any other external component or device. Network 220 may be any wired and/or wireless network, including but not limited to WiFi, Bluetooth, intranet, internet, and/or any other network.

The trigger 130 may be any trigger, event, condition, person, sound, object, or other predetermined element to which the user wants to be notified. For example, the trigger may be the presence and/or proximity of an individual or other item, the presence and/or proximity of a particular individual as detected by facial recognition or other cue, a noise or sound within the external environment which may or may not be audible by humans, a specific sound such as an announcement, and/or a specific person's voice.

According to an embodiment, the trigger may be a sound identified from the sensor data as coming from a particular location relative to the user. For example, the ANR system may determine from the sensor data that a particular sound is coming from behind the user, and this direction may be programmed as a triggering direction. Multiple sensors can be integrated or utilized for trigger detection. For example, the ANR system can determine from accelerometer data that the user is walking. The accelerometer data may also indicate an orientation or other movement of the device. Given that the user is walking, and/or that the device is oriented forward and/or downward, the system may determine from a rule set or other programming that sounds identified as coming from behind the user are triggering sounds. As another example, a light sensor of the device may determine that the user is in a dark location or a device clock may determine that it is nighttime, in which case the system may activate or prioritize certain triggers. Many other variations are possible.

When the trigger 130 is identified by ANR system 200, the ANR device alerts the user to the presence and/or identity of the trigger 130 via an alert mechanism. The alert mechanism may be any response or action by the device 10 or a component of the device to alert the user to the presence and/or identity of the trigger 130. For example, the alert may be a haptic or audio signal to the user, pausing or stopping a playback of audio via the device, changing the volume of the audio, entering a second operating mode, playing a tone, selecting audio for playback to the user, and/or electronically orienting a microphone, among many other possible alerts.

Figure 3:
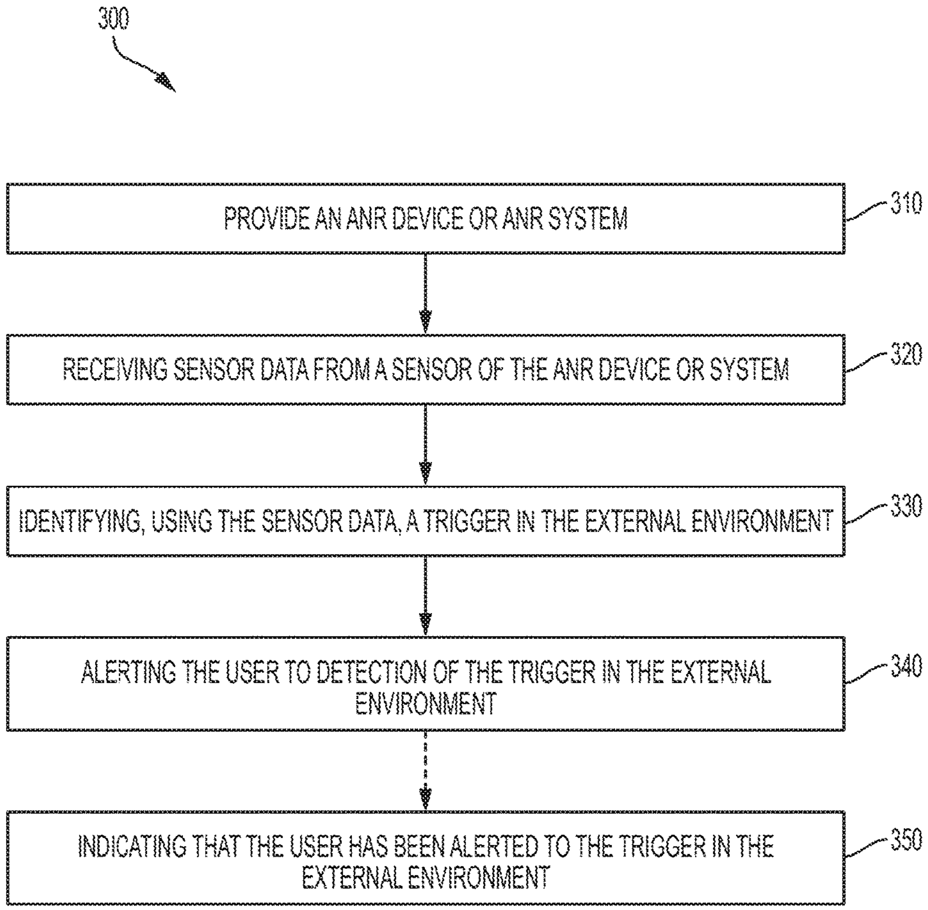
FIG. 3 is a flowchart of an example method for automatically alerting a user to the existence of a predetermined trigger in an external environment.

FIG. 3 is a flowchart of a method 300 for automatically alerting a user of an ANR device to a trigger in the external environment. The trigger may be any preprogrammed, predetermined, learned, or wanted stimulus or event in the external environment. At step 310 of the method, an ANR device or system is provided. The ANR device or system can be any of the devices or systems described or otherwise envisioned herein, including ANR device 10 and ANR systems 100 and 200.

At step 320 of the method, the ANR device or system receives sensor data from the external environment via sensor 32. The sensor may be an integral component of the ANR device 10, or may be a component of the external computing device 210. Alternatively, both the ANR device 10 and the external computing device 210 may comprise one or more sensors configured to obtain sensor data representative of or indicative of an external environment. The sensor may be any sensor capable or and/or configured to obtain data from the external environment, including data indicative or representative of an external trigger 130. For example, the sensor may be a LIDAR sensor, a radar sensor, a thermal sensor, an ultrasonic sensor, a camera, and/or a microphone, among many other types of sensors. In one implementation, the ANR device is operating in a first noise reduction mode in which the ANR circuit is actively reducing unwanted noise.

Once the sensor data is obtained by the sensor, the data may be analyzed directly, or may be communicated to the ANR circuit 24 and/or the control circuit 26. In one implementation, the sensor data may be temporarily or permanently stored for subsequent analysis.

At step 330 of the method, the ANR device or system identifies a predefined, preprogrammed, learned, or predetermined trigger 130 in the external environment using the obtained sensor data obtained from sensor 32. In one implementation, the sensor 32 is configured or programmed to provide obtained sensor data to the ANR circuit 24 and/or the control circuit 26, where it is analyzed for data representative of or indicative of the trigger 130 in the external environment. In another implementation, the sensor analyzes the obtained sensor data to identify and/or characterize the trigger 130 in the external environment.

Trigger 130 may be any trigger, event, condition, person, sound, object, or other element about which the user wants to be notified. For example, the trigger may be the presence and/or proximity of an individual or other item, the presence and/or proximity of a particular individual as detected by facial recognition or other cue, a noise or sound within the external environment which may or may not be audible by humans, a specific sound such as an announcement, and/or a specific person's voice.

For example, the ANR device or system can analyze the obtained sensor data for identification of a particular individual using facial recognition software. The sensor 32 may be a camera that periodically or continuously obtains images, or obtains images when it is alerted to the presence of an individual. The ANR device or system can comprise a processor with facial recognition software, or can communicate with an external device that comprises facial recognition software, which analyzes the obtained images. The system may then identify an individual by comparing features identified as or learned to be faces to a pre-programmed or learned database of faces or identities to which the user wishes to be notified.

As another example, the ANR device or system can analyze the obtained sensor data for particular sounds or words. The sensor 32 may be a microphone that periodically or continuously obtains sound data, or obtains sound data when it is alerted to or activated by sound of a certain quality or above a certain threshold. The ANR device or system can comprise a processor that processes the sensor data to identify a sound having a predetermined, learned, or desirable quality, characteristic, and/or parameter and about which the user wishes to be notified. For example, the sensor 32 may be a microphone that obtains sensor data from announcements in the external environment, which may be an airport. The ANR device or system analyzes the sensor data to identify announcements that contain information about the user's flight or other information about the user or that the user has indicated is important.

In one implementation, the sensor 32 is configured to respond to a particular source of sensor data indicating the presence of the trigger. For example, the sensor may be a microphone configured to obtain data from an ultrasonic audio band, and the detection of any data in this ultrasonic audio band is the trigger 130. Accordingly, this ultrasonic audio band may be utilized to automatically identify the presence of the trigger in the external environment.

In one implementation, the ANR device or system is trained to identify a trigger in sensor data. For example, the user can program or otherwise train the device to identify specific people, sounds, objects, or other potential triggers. Alternatively and/or additionally, the ANR device or system may be configured to analyze triggers to which the user naturally responds, and then utilize the results of that analysis to program the device to automatically respond when it next detects those triggers in the obtained sensor data.

At step 340 of the method, the ANR device or system automatically provides an alert to the user, in response to detection of the trigger, indicating the trigger 130 in the external environment. The alert may be any response or action by the ANR device or system to alert the user to the presence and/or identity of the trigger 130. For example, the alert may be a haptic or audio signal to the user, pausing or stopping a playback of audio via the device, changing the volume of the audio, entering a second operating mode, playing a tone, selecting audio for playback to the user, and/or electronically orienting a microphone, among many other possible alerts.

In an implementation, detection of the trigger in the external environment results in the ANR circuit 24 and/or the control circuit 26 providing an alert to the user. The alert may be a modification of the ANR process such that the device enters a second operating mode in which the ANR process is either diminished, deactivated, or otherwise modified such that the user is alerted to the trigger. The modification can get the user's attention, and/or can allow hear-through of ambient sounds in the external environment to the user, among other alerts. Providing natural hear-through of ambient sounds may accomplished through modifications to the active noise cancellation filters. For example, as explained in U.S. Pat. No. 8,155,334, incorporated herein, a feed-forward filter implemented in a digital signal processor can be modified to provide hear-through by not completely cancelling all, or only cancelling a subset, of the ambient noise.

In an implementation, the detection of the trigger in the external environment results in display of an image, name, or other identification of the trigger in the user's field of view. In an example, an image obtained by the sensor 32 is displayed to the user via the ANR device or via an external computing device such as a computer, smartphone, wearable, or other device. In another example, the ANR device drives the acoustic transducer to announce the presence of a trigger, which may be an identification of the trigger such as an individual's name.

At optional step 350 of the method, the ANR device or system provides an indication that the user of the ANR device has been alerted to the presence and/or identity of trigger 130 in the external environment. The indication may be provided via indicator 34 of the device or system. The indicator may be a light, visual display, and/or sound, among many other possible indicators. For example, the indicator may be disposed on or in one or more external surfaces of the earpiece 110 or ANR device 10 to provide an indication to the external environment that trigger 130 has been identified, and/or that the user has been notified of the trigger. For example, if the trigger is the presence of an individual other than the user, the detection of an individual in the external environment will trigger an alert to the user, and the indicator 34 will provide an indication, such as a light, sound, or visual display, that the individual has been detected. The indicator 34 can, for example, provide an indication to the external environment that the ANR device has entered an alternative operating mode in response to detection of a trigger.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A method for automatically alerting, via an active noise reducing device comprising a camera, a user to a nearby person in an external environment, the method comprising:

receiving, via the camera while the active noise reducing device is in a first operating mode in which the noise reducing device is reducing ambient noise from the external environment, image data from the external environment;

identifying, via facial recognition analysis performed on the image data, the nearby person in the external environment; and automatically providing an alert to the user, in response to identifying the nearby person, wherein the alert comprises entering a second operating mode of the active noise reducing device, the second operating mode characterized by providing hear-through of ambient sound in the external environment to the user.

2. The method of claim 1, wherein the camera is disposed on an external portion of the active noise reducing device.

3. The method of claim 1, wherein the the nearby person is a specific person identified by the facial recognition analysis of the image data.

4. The method of claim 1, wherein the alert further comprises a haptic or audio signal to the user.

5. The method of claim 1, wherein the alert further comprises pausing or stopping a playback of audio via the device.

6. The method of claim 1, wherein the alert further comprises lowering a volume of the device or amplifying a sound from the external environment.

7. The method of claim 1, further comprising the step of indicating, via the device, that the alert has been provided to the user.

8. The method of claim 1, wherein the identifying step is performed by an external computing device.

9. The method of claim 1, wherein the providing step is performed via an external computing device.

10. The method of claim 1, wherein the active noise reducing device comprises a sensor in addition to the camera, wherein the method further comprises:

receiving, via the sensor while the active noise reducing device is in the first operating mode, sensor data from the external environment;

identifying, from the sensor data, a predetermined trigger in the external environment; and automatically, in response to the predetermined trigger, entering the second operating mode of the active noise reducing device.

11. The method of claim 10, wherein the is an external microphone.

12. The method of claim 11, wherein the predetermined trigger is a specific sound identified by the sensor data.

13. The method of claim 11, wherein the predetermined trigger is a sound identified from the sensor data as coming from a particular location relative to the user.

14. The method of claim 10, wherein the sensor is selected from the group consisting of: a LIDAR sensor, a radar sensor, a thermal sensor, and an ultrasonic sensor.

15. An active noise reducing device comprising:

an earpiece;

a microphone configured to obtain acoustic data from an external environment; and a processor configured to: (i) receive, via the microphone while the active noise reducing device is in a first operating mode in which the noise reducing device is reducing ambient noise from the external environment, acoustic data from the external environment; (ii) identify, from the acoustic data, a directionality of an acoustic signal received from the external environment; and (iii) automatically provide an alert to a user of the active noise reducing device, in response to the directionality being determined as corresponding to a triggering direction with respect to the user, wherein the alert comprises entering a second operating mode of the active noise reducing device, the second operating mode characterized by providing hear-through of ambient sound in the external environment to the user.

16. The active noise reducing device of claim 15, wherein the triggering direction is determined as coming from behind the user.

17. The active noise reducing device of claim 15, wherein the microphone is disposed on an external portion of the active noise reducing device.

18. The active noise reducing device of claim 15, wherein the active noise reducing device also includes at least one sensor selected from the group consisting of: a LIDAR sensor, a radar sensor, a thermal sensor, an ultrasonic sensor, and a camera.

19. The active noise reducing device of claim 15, wherein the processor is also configured to automatically enter the second operating mode upon detection of a specific sound identified by the acoustic data.

20. The active noise reducing device of claim 15, further comprising an indicator configured to indicate that the alert has been provided to the user.

21. An active noise reducing system comprising:

active noise reducing device comprising: (i) an earpiece; and (ii) a camera configured to obtain image data from an external environment while the active noise reducing device is in a first operating mode in which the active noise reducing device is reducing ambient noise from the external environment; and a processing device configured to: (i) identify, via facial recognition analysis performed on the image data, the nearby person in the external environment; and (ii) direct the active noise reducing device to provide an alert to the user, in response to identifying the nearby person, wherein the alert comprises entering a second operating mode of the active noise reducing device, the second operating mode characterized by providing hear-through of ambient sound in the external environment to the user.

* * * * *